3,490,719
ATTITUDE CONTROL SYSTEM
Clarence Cantor, Alexandria, Va., and Frank A. Volpe, Hyattsville, Md., assignors to the United States of America as represented by the Administrator of the National Aeronautics and Space Administration
Filed Jan. 24, 1968, Ser. No. 700,142
Int. Cl. B64g 1/20
U.S. Cl. 244—1                               11 Claims

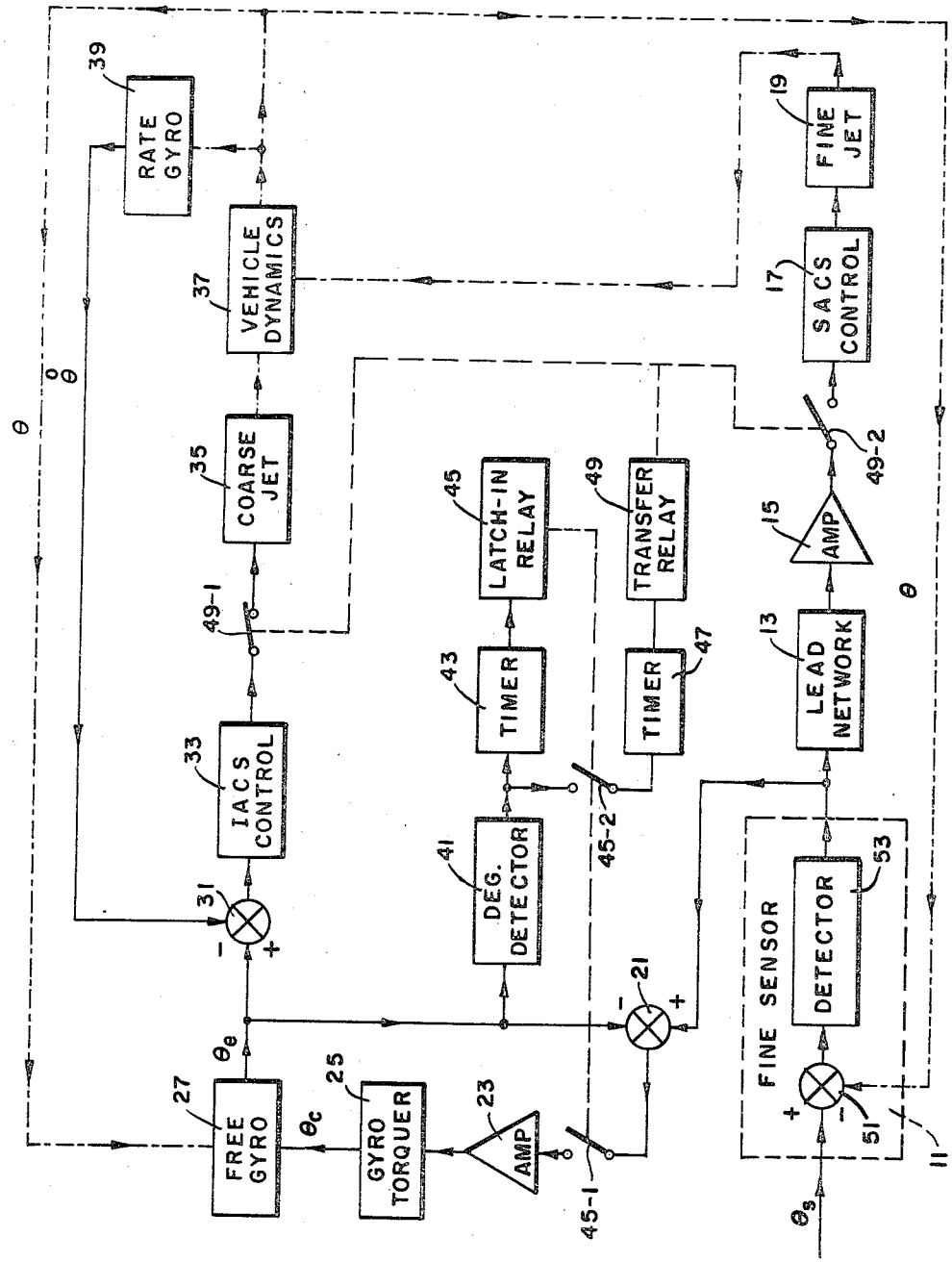

ABSTRACT OF THE DISCLOSURE

This invention is an apparatus for controlling the pointing (attitude) of a space vehicle. An inertially-referenced attitude controlled-system (IACS) is combined with a stellar or solar attitude control system (SACS) to form a fine attitude control system (FACS). Initially, coarse jets under the control of the IACS roughly point the space vehicle toward the desired target. Thereafter, the fine sensor of the SACS is used to correct the errors in the coarse reference and simultaneously to point the vehicle closer to the target via the coarse jets. Finally, fine jets under the control of the SACS accurately point the vehicle at the target and maintain this fine pointing.

---

The invention described herein was made by employees of the United States Government and may be manufactured and used by or for the Government for governmental purposes without the payment of any royalties thereon or therefor.

BACKGROUND OF THE INVENTION

Two of the major problems of space research vehicles are accurately pointing the vehicle at a target and thereafter maintaining accurate pointing. Accurate pointing is essential to space research so that the data collected by the vehicle's sensors is meaningful. For example, data on the earth's magnetic field is meaningful only when the axes of the vehicle's magnetic field sensors are related to a known reference such as the earth's axes. A further example is telescopic observation from a space vehicle. Before accurate telescopic observations of a star, for example, can be made the axis of the telescope must be accurately pointed at the star. Hence, accurate vehicle pointing is necessary for telescopic observations. Further, after accurate pointing is obtained, it is essential that accurate pointing be maintained.

While the hereinafter described invention was developed for accurately pointing a sounding rocket at a target and is described in a sounding rocket environment, it is also suitable for use on other types of space vehicles such as orbiting satellites and interplanetary probes.

The prior art has attempted to solve the accurate pointing problem of sounding rockets and other space vehicles in various ways. The closest prior art system to the present invention utilizes a gas jet attitude control system employing an inertially-referenced attitude control system (IACS) together with a stellar or solar attitude control system (SACS). However, the method of target acquisition utilizing these two control systems is different than the present invention. Specifically, the foregoing prior art system utilizes the IACS to point the rocket approximately on target. The approximation is within the accuracy of position gyros included on the space vehicle. When this approximate pointing condition occurs, the attitude control of the rocket is switched completely to the SACS. Simultaneously with the switching, the outputs of the free gyros located along the various axes of the space craft are mixed with the outputs of stellar or solar sensors. The mixed signal is fed to gyro torquers that control the gyros. The gyro torquers move the gyros until the output signal compares with the output signal of the stellar or solar sensor.

The problem with the foregoing prior art system is that as soon as switching to the SACS system occurs, each gyro output rises since it is now slaved to a stellar or solar sensor output signal. When the voltage rises to a point above the approximate pointing limit of the IACS, the SACS is disconnected and the controls switched back to the IACS. At this point gyro torquing ceases. This undesirable movement from the fine system to the coarse system occurs even though the space vehicle may still be a few degrees away from the accurate reference established by the stellar or solar sensor. When the IACS re-stabilizes the rocket such that the gyro output voltage is again less than the aproximate error, the foregoing sequence is repeated. That is, the SACCS takes over control; however, if the rising output of the gyro goes beyond the control limit of the SACS, the IACS again takes over. This switching between modes continues until finally the rocket attitude error as well as the gyro output error are less than the error limit of the SACS. At this point the switchover to the SACS results in no further rise of the gyro output in excess of the approximate error. Thereafter, the system remains in the SACS mode with the gyro slaved to the stellar or solar sensor and fine pointing is achieved.

The primary disadvantage with the foregoing system is the characteristic switching back and forth between a fine and a coarse control mode. Because this prior art system does not have a clean-cut, one-time, uni-directional control transfer from the coarse to the fine mode, the system requires much longer acquisition time than is desirable. In addition, the overall reliability of the control system is reduced because of the excessive switching. That is, excessive system switching results in excessive relay contact chattering tending to destroy the relay contacts.

Therefore, it is an object of this invention to provide a new and improved target acquisition system for use on a space vehicle.

It is the further objective of this invention to provide a new and improved target acquisition system for use on a space vehicle that does not chatter between two modes of operation.

It is another objective of this invention to provide a new and improved target acquisition system for use on a sounding rocket or other space vehicle that is uncomplicated and reliable and has a uni-directional transfer between a coarse and a fine mode of target acquisition.

SUMMARY OF THE INVENTION

In accordance with a principle of this invention a target acquisition system for use on a space vehicle is provided. The system includes an inertially-referenced attitude control system (IACS) and a stellar or solar attitude control system (SACS) to form a fine attitude control system (FACS). The IACS and the SACS include coarse and fine control jets respectively, and, the vehicle contains reference gyros (free gyros) and reference gyro torquers. Initially, the reference gyros are moved by the gyro torquers to positions that approximate the desired attitude of the vehicle. After this movement, the reference gyros generate error signals proportional to the attitude error between the gyro position and the vehicle position in each axis. The error signals are used by the IACS to control the energization of the coarse jets. The coarse jets move the vehicle to aproximately the desired attitude. Thereafter, output signals from the reference gyros are slaved to the output signals of the fine sensor connected to the SACS. This enables the fine sensor to corect the errors in the reference gyros and simultaneously move the vehicle closer on target via the coarse jets. After gyro stabilization occurs, the IACS is disconnected and the fine jets of the SACS are energized to accurately move the space vehicle to the desired attitude and to maintain this attitude.

In accordance with another principle of the invention, timer means are provided to allow the vehicle to stabilize at the approximate attitude before the IACS is disconnected. In addition, rate gyro means are included in the IACS to supply vehicle damping so as to prevent vehicle overshoot and the resultant hunting that occurs when overshooting occurs.

In accordance with a further principle of the invention the IACS can control along all three axes of the vehicle (yaw, pitch and roll) while the SACS only controls along two axes (yaw and pitch) if the invention is used on a sounding rocket or on other space vehicles where accurate pointing along only two axes is required.

It will be appreciated by those skilled in the art and others that the invention is a relatively uncomplicated system for accurately pointing a space vehicle. The use of coarse and fine jets under the control of coarse and fine control systems with a uni-directional transfer from the coarse to the fine system prevents undesired chattering between the two systems. In addition, the slaving of the gyro torquers of the space vehicle to the sensor of the fine system aids in accurately orienting a space vehicle to a series of targets, since the gyro errors are corrected at each target. Further, the inclusion of a timer means provides for stabilization prior to switching from the coarse to the fine system thus insuring a reliable uni-directional transfer. In addition, the inclusion of rate gyros prevents undesirable hunting which could occur if rapid movement from one position to another were allowed.

It will also be appreciated that the invention provides for ease of movement from one desired vehicle position to a second desired position. That is, it may be desirable to first point the space vehicle at one target and then move it to the second target. Due to the operation of the invention, all that is necessary is to command the reference gyros of the space vehicle to the approximate position of the second target. Thereafter, the IACS and SACS will control the accurate pointing of the vehicle. Hence, the invention also provides ease of rapid movement from one target to a second target.

BRIEF DESCRIPTION OF THE DRAWING

The foregoing objects and many of the attendant advantages of this invention will become more readily appreciated as the same becomes better understood by reference to the single figure which is a block diagram of the invention simplified so as to show IACS and SACS control along only one axis. However, it will be appreciated from the hereinafter description that the invention will control along all three axes or only two axes as desired.

DESCRIPTION OF THE PREFERRED EMBODIMENT

The embodiment of the invention illustrated in the figure comprises: a fine sensor 11, a lead network 13, a first amplifier 15, a SACS control 17, a fine jet 19, a first signal summation network 21, a second amplifier 23, a gyro torquer 25, a free gyro 27, a second signal summation network 31, an IACS control 33, a coarse jet 35, vehicle dynamics 37, a rate gyro 39, a degree detector 41, a first timer 43, a latch-in relay 45, a second timer 47, and a transfer relay 49. The fine sensor includes a summation point 51 and a detector 53.

One input to the fine sensor (solar or stellar) is designated as $\theta_s$. This represents the angular position of the target (sun or star) and is connected to one input of the summation point 51. For purposes of illustration this input is designated the positive (+) input. The output of the summation point 51 represents the difference between $\theta_s$ and the actual vehicle position $\theta$. This difference is converted into an electrical signal by the detector 53.

The output of the detector is connected to the input of the lead network 13 and to one input of the first signal summation network 21—designated the positive (+) input.

The output from the lead network 13 is connected through the first amplifier 15 to one side of a set of relay contacts 49-2 controlled by the transfer relay 49. The other side of the contacts 49-2 is connected to the input of the SACS control 17. The output of the SACS control 17 is connected to the input of the fine jet 19. An action line is connected from the fine jet 19 to the vehicle dynamics 37 to illustrate the fact that the operation of the fine jet produces vehicle motion via the vehicle dynamics.

The output of the first signal summation network 21 is connected through a set of relay contacts 45-1, under the control of the latch-in relay 45, to the input of the second amplifier 23. The output of the second amplifier is connected to the input of the gyro torquer 25. The gyro torquer is mechanically or magnetically coupled to the free gyro 27.

The output of the free gyro 27 is connected to: one input of the second signal summation network 31, designated as the positive (+) input; one input of the first summation network 21, designated as the negative (−) input; and the input of the degree detector 41.

The output of the second summation network 31 is connected to the input of the IACS control 33. The output of the IACS control is connected through a second set of relay contacts 49-1, controlled by the transfer relay 49, to a coarse jet 35. An action line is connected from the coarse jet to the vehicle dynamics 37. Hence, the vehicle motion is controlled by both the fine jet and the coarse jet operation.

The output of the vehicle dynamics 37 which represents vehicle motion, is shown connected to: the input of the rate gyro 39; the second or negative (−) input of the summation point 51; and the second input of the free gyro 27. The output of the rate gyro 39 is connected to the second or negative (−) input of the second summation network 31.

The output from the degree detector 41 is connected to the input of the first timer 43 and through a second set of relay contacts 45-2, under the control of the latch-in relay, to the input of the second timer 47. The output of the first timer 43 is connected to the input of the latch-in relay 45 and the output of the second timer 47 is connected to the input of the transfer relay 49.

It will be appreciated by those skilled in the art and others that the invention illustrated in the figure includes an IACS for controlling coarse jet and a SACS for controlling a fine jet where both jets control the same axis of the space vehicle. The loop including the second amplifier 23, the gyro torquer 25, the free gyro 27 and the first summation network 21 when contacts 45-1 are closed is the gyro reference loop. This loop is under the control of (slaved to) the stellar or solar sensor when contacts 45-1 close because the sensor signal is connected from the fine sensor 11 to one input of the first summation network 21.

It will also be appreciated that while the figure only illustrates a system for controlling pointing along one axis of the space vehicle, similar systems can be utilized to control a second axis or all three axes of the space vehicle. When the invention is to be used on a sounding rocket generally an IACS operates along all three axes (roll, pitch and yaw) while a SACS only operates along two axes (yaw and pitch). Two axes' fine operation can be used on a sounding rocket because the sensing devices located on the rocket are generally located at one end of the rocket. Because of this location variations in rocket roll have little effect on the operation of the sensors. However, the pitch and yaw of the sounding rocket do affect the sensors, hence, the pitch and yaw require fine pointing whereas roll only requires coarse pointing.

Turning now to the operation of the IACS portion of the invention illustrated in the figure, initially the free gyro 27 is set to a predetermined inertial reference. Preferably the free gyro 27 contains two 2-degree of freedom gyros with spin axes at right angles to each other. The inner gimbal of one gyro provides a yaw position signal and the inner gimbal of the other gyro provides a pitch position signal. One of the outer gimbals provides a roll position signal. After setting the initial inertial reference, angular command signals are applied to the system so that a new inertial reference is obtained corresponding to the approximate position of the target. For example, the desired reference can be obtained by torquing the gyro's gimbals to new reference positions. It should be understood that the hereinabove and hereinafter discussion of "torquing a gyro" actually means torquing the gyro's gimbal along the axis of interest rather than physically moving the entire gyro. After the gyros are torqued to the new reference positions, free gyro 27 generates an error signal $\theta_e$ in each axis that is proportional to the difference between the gyro reference position $\theta_c$ and vehicle position $\theta$ in that axis.

To prevent overshoot or hunting the rate gyro 39 is provided. Specifically, the rate gyro detects the rate of movement of the vehicle (when movement commences) and generates a feedback signal $(\dot\theta)$ that is summed with the error signal from the free gyro in the second summation network 31. The summed signal is applied to the IACS control.

The IACS control through latch-in relay contacts 49-1 applies activation and deactivation signals to control the coarse jet. In this manner the IACS controls the coarse jet so that the space craft is moved to a new position—the new position approximates the desired target position. Preferably, the signal from the IACS controls the opening and closing of a coarse jet valve that allows the jet nozzle to emit a gas such as pressurized helium, for example.

As the coarse jet causes movement of the space craft, the degree detector 41 detects the error signal $(\theta_e)$ from the free gyro 27. When the error signal drops below a predetermined level, the first timer 43 is triggered. For example, if it desired that the approximation be within ±.3 degree of error, when this condition is reached the degree detector 41 generates an output signal that triggers the first timer 43. After a predetermined period of time, to determine if the error signal will remain within the approximation range, the timer generates an output signal that triggers the latch-in relay 45.

When the latch-in relay 45 is triggered, its contacts 45-1 and 45-2 close. When contacts 45-1 close, the loop including the gyro torquer, the free gyro and the first summation network are slaved to the output from the fine sensor 11. Hence, the error signal $\theta_e$ is slaved to the output from the fine sensor. Simultaneously, with the slaving of the error signal, the IACS operates the coarse jets in accordance with the slaved error signal, to stabilize the vehicle to the corrected gyro reference. That is, when the free gyro loop is initially slaved to the fine sensor output, a new error is obtained; however, because there has not been a transfer from the IACS mode to the SACS mode, the IACS jet attempts to compensate for the new error. The operation of the IACS jet will be in a direction to move the vehicle closer to the actual target.

When the gyro loop error $\theta_e$ again stabilizes to within the predetermined ±.3 degree of error for a period of time determined by the second timer 47 which was set or triggered when the latch-in relay operated to close its contacts 45-2, the transfer relay 49 operates. Transfer relay 49 switches the system from the IACS mode to the SACS mode by opening the signal path from the IACS control 33 to the coarse jet 35 and closing the signal path from the first amplifier 15 to the SACS control 17.

The SACS control receives an error signal from the fine sensor 11 which is either a solar or stellar sensor. The sensor generates an error signal that is proportional to the difference between the position of the target ($\theta_s$) and that of the vehicle ($\theta$). This subtraction is shown schematically at the summation point 51. The detector 53 generates the fine error signal and applies it to the lead network 13. The lead network 13 derives rate information from the error signal to prevent overshoot and the resultant hunting. The lead network applies the control signal through the first amplifier 15 to the SACS control. The SACS control operates in an identical manner to the IACS control. That is, the SACS control controls valves in the fine jet 19 to control the emission of a pressurized gas. The emission of the gas moves the space vehicle about the axis under the control of the SACS control 17. In this manner, the space vehicle can be moved to within ±15 arc seconds of error, for example. It will be appreciated by those skilled in the art and other that ±15 arc seconds of error is considerably less error than prior art system error. In addition to greater accuracy, the invention provides a means for rapidly moving the space craft to a precise target pointing attitude.

A more precise description of the operation of the gyro loop is as follows, the signal from the stellar or solar sensor is used to command the loop through the first summation network 21. The gyro error signal is subtracted from the stellar sensor signal to provide an error signal that passes through latch-in relay contacts 45-1; these contacts had closed when the IACS reduced the gyro error to within ±.3 of a degree of error for a given period of time determined by the first timer 43. This delay allows the coarse system to stabilize prior to gyro torquing. After the IACS gyro torquing loop re-stabilizes the gyro error to within ±.3 of a degree of error for one second, for example, as determined by the second timer 47, the transfer relay 49 is actuated. At this point, IACS operations stops and SACS operation starts.

Turning now to a general summary of events, upon initiation to acquire a target star, for example, the vehicle's gyros are torqued to the predicted location of the star by ground control or by computer control in the space vehicle. This torquing immediately produces a large coarse error signal and the coarse jet is energized to slew the vehicle to its proper attitude. During this maneuvering the gyro error is greater than ±.3 of a degree and so latch-in relay 45 is not actuated. Because latch-in relay 45 is not actuated, its contacts (45–1) are open and no gyro torquing takes place. In addition, the fine jet 19 is not operated because contacts 49–2 are open.

When the gyro error becomes less than ±.3 of a degree for a given period of time, the latch-in relay latches in. This latch-in causes two actions. First the gyro torquer loop is closed and the free gyro is slaved to the stellar sensor output. Second, the second timer 47 is triggered. When the gyro torquer loop closes, the gyro torquer 25 immediately torques the free gyro toward the fine sensor 53 reference (sun or star). This may drive the gyro error out of the ±.3 of a degree of error range and the second timer 47 is reset preventing the transfer relay 49 from operating. Since latch-in relay 45 is latched, gyro torquing continues. Gyro torquing continues in conjunction with the coarse jet operation until the gyro error is again reduced to within ±.3 of a degree. At this point the timer 47 is energized and if a predetermined period passes transfer relay 49 operates. When transfer relay 49 operates, the fine jet 19 is enabled by the SACS control 17 to bring the space vehicle to an accurate pointing attitude.

If for any reason the error again exceeds ±.3 of a degree, transfer relay 49 drops out and the fine jet is disabled. However, the coarse jet is enabled and the above sequence is repeated.

It will be appreciated by those skilled in the art and others that the invention is a rather uncomplicated apparatus for accurately pointing a space vehicle at a target. It will also be appreciated by those skilled in the art that numerous modifications may be made in light of the foregoing description. For example, the invention has been described for use on a sounding rocket, however, it has broader application because it is useful on the other types of space vehicles such as orbiting satellites and interplanetary probes. Hence, the invention can be practiced otherwise than as specifically described herein.

What is claimed is:

1. A fine attitude control system for use on a space vehicle comprising:
   an inertially referenced control means for coarse control;
   a sensor attitude control means for fine attitude control;
   a gyro attitude control means connected to said inertially referenced attitude control means and to said sensor attitude control means for controlling said space vehicle during transfer from said inertially referenced attitude control means to said sensor attitude control means;
   first transfer means for transferring control from said inertially reference attitude control means to said gyro attitude control means; and
   second transfer means for transferring control from said gyro attitude control means to said sensor attitude control means.

2. A fine attitude control system as claimed in claim 1 wherein said gyro attitude control means includes a gyro loop adapted to be slaved to said sensor attitude control means.

3. A fine attitude control system as claimed in claim 2 wherein said inertially referenced control means comprises:
   an inertially referenced attitude control system control connected to said gyro loop; and
   a coarse jet connected to the output of said inertially referenced attitude control system control.

4. A fine attitude control system as claimed in claim 3 wherein said sensor attitude control means comprises:
   a fine sensor for generating signals representing the relative position of a predetermined object in space;
   a lead network connected to the output of said fine sensor;
   a sensor attitude control system control connected to the output of said sensor attitude control system control.

5. A fine attitude control system as claimed in claim 4 wherein said first transfer means comprises:
   a degree detector connected to said gyro loop;
   a first timer connected to the output of said degree detector; and a latch-in relay connected to the output of said first timer.

6. A fine attitude control system as claimed in claim 5 wherein said second transfer means comprises:
   a pair of contacts operated by said latch-in relay having one side connected to the output of said degree detector;
   a second timer connected to the other side of said relay contacts; and
   a transfer relay connected to the output of said second timer.

7. A fine attitude control system as claimed in claim 6 wherein said gyro loop comprises:
   a first summation network connected to the output of said fine sensor;
   a set of relay contacts operated by said latch-in relay having one side connected to the output of said first summation network;
   a gyro torquer having its input connected to the other side of said relay contacts; and
   a free gyro and a second input representing the vehicle position, the output of said free gyro connected to the second input of said first summation network and to the input of said degree detector.

8. A fine attitude control system as claimed in claim 7 wherein said transfer relay operates two sets of contacts, one set of contacts located between said inertially referenced attitude control system control and said coarse jet and a second set of contacts connected between said lead network and said sensor attitude control system control.

9. A fine attitude control system as claimed in claim 8 including:
   a rate gyro having its input representing said vehicle position; and
   a second summation network having one input connected to the output of said rate gyro, a second input connected to the output of said free gyro, and an output connected to the input of said inertially referenced control system control.

10. A fine attitude control system as claimed in claim 9 wherein said fine sensor comprises:
    a summation point and a detector connected so that said detector generates an error signal proportional to the difference between the position of the target and that of the vehicle, the output of said detector being connected to said lead network and to said first summation network.

11. A fine attitude control system as claimed in claim 10 including:
    a first amplifier connected between said lead network and said contacts under the control of said transfer relay; and
    a second amplifier connected between said contacts under the control of said latch-in relay and said gyro torquer.

References Cited

UNITED STATES PATENTS

| | | | |
|---|---|---|---|
| 2,794,928 | 6/1957 | Frank | 318—30 X |
| 3,133,520 | 5/1964 | Bentkowsky et al. | 244—76 X |
| 3,260,485 | 7/1966 | Lerman et al. | 244—77 |

FERGUS S. MIDDLETON, Primary Examiner

U.S. Cl. X.R.

244—3.18, 77; 318—489